UNITED STATES PATENT OFFICE.

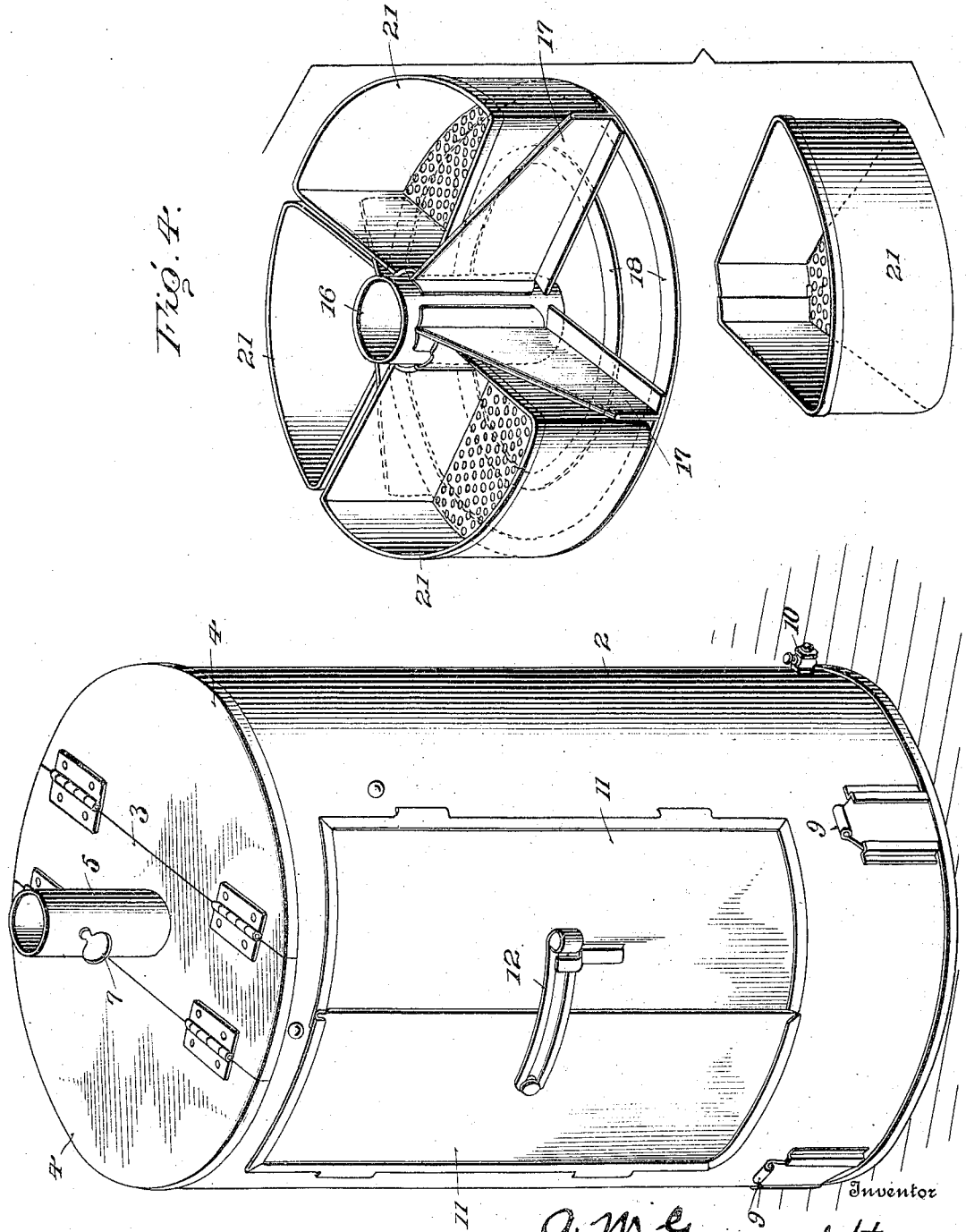

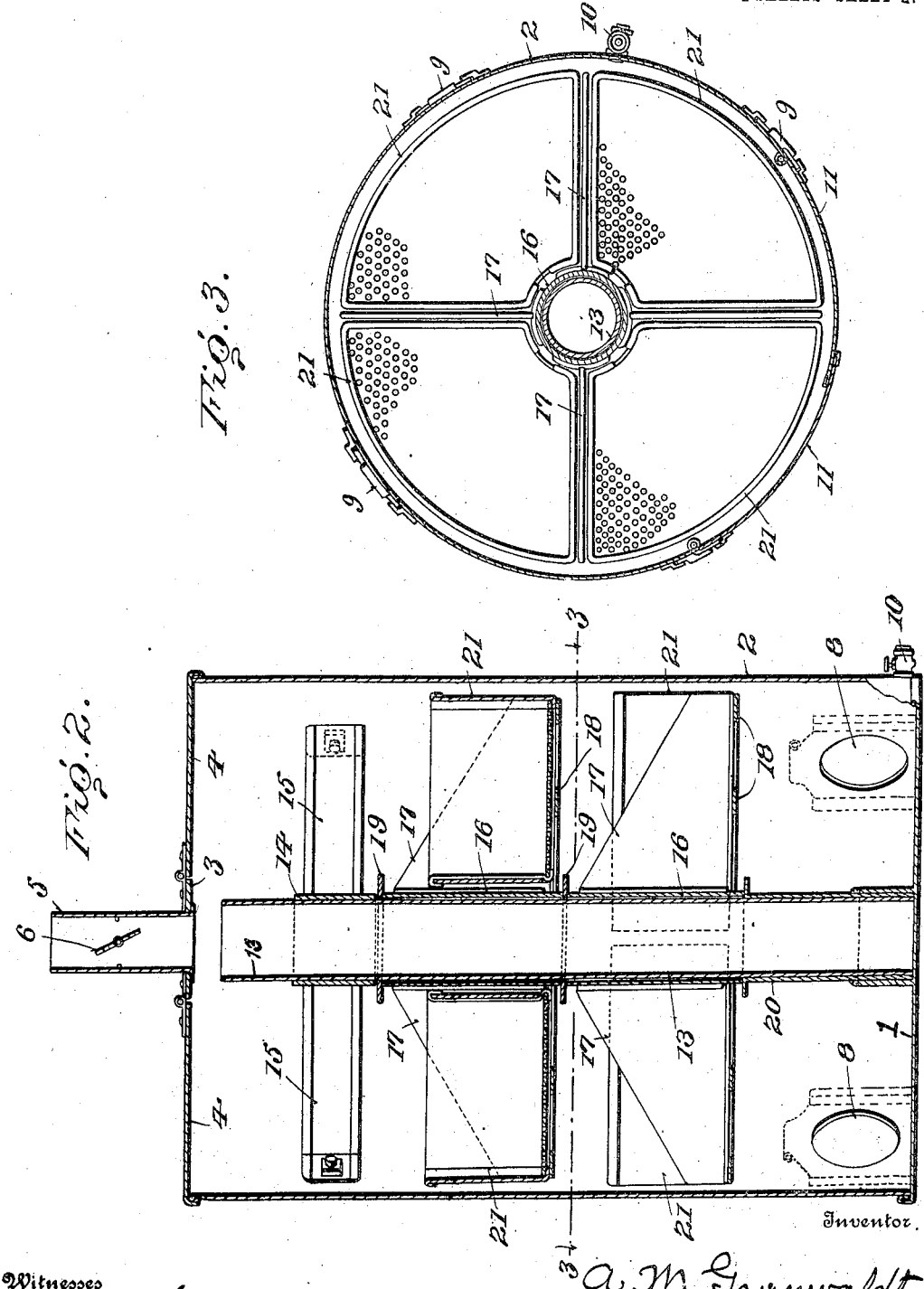

ALBERT W. GRUNWALDT, OF ABRAMS, WISCONSIN.

GRAIN SPROUTING OR GERMINATING APPARATUS.

No. 922,888.　　　Specification of Letters Patent.　　Patented May 25, 1909.

Application filed April 16, 1908. Serial No. 427,426.

*To all whom it may concern:*

Be it known that I, ALBERT W. GRUNWALDT, a citizen of the United States, residing at Abrams, Oconto county, Wisconsin, have invented certain new and useful Improvements in Grain Sprouting or Germinating Apparatus; and I do hereby declare the following to be a full, clear, and exact description of the invention, such as will enable others skilled in the art to which it appertains to make and use the same.

This invention relates to certain improvements in apparatus for sprouting grain for cattle feed; and the objects and nature of the invention will be readily understood by those skilled in the art in the light of the following explanation of the accompanying drawings illustrating what I now consider my preferred embodiment from among other constructions and arrangements within the spirit and scope of my invention.

An object of the invention is to provide a convenient and efficient apparatus for use in connection with the process of treating grain by moisture to cause the grain to swell and sprout or germinate preparatory to the use thereof as feed for cattle.

A further object of the invention is to provide an apparatus wherein a plurality of separately maintained measured quantities of grain can be efficiently germinated, and properly ventilated and supplied with air or free oxygen, and whereby said measured quantities of grain can be conveniently placed in and removed from the apparatus.

A further object of the invention is to provide simple inexpensive and efficient apparatus for use on the farm for the purpose of growing or sprouting grain for cattle feed and wherein the grain growing process can be easily carried on by the layman by hand without the employment of a power plant or other motor or driving means and without a steam generator or other heater or furnace, and wherein grain boxes are employed of a capacity enabling them to be readily inserted and removed by hand, and wherein the operator can readily gain access to each grain box within the apparatus to sprinkle or stir the grain therein by hand, and wherein the operator can readily shut off or control the entrance of outside air into the apparatus to maintain the desired grain growing humidity within the apparatus or can readily increase the flow of outside air into the apparatus to prevent souring of the grain therein.

The invention consists in certain novel features in construction or in combinations and arrangements of parts as more fully and particularly set forth and specified hereinafter.

Referring to the accompanying drawings:—
Figure 1, is a perspective view of the apparatus. Fig. 2, is a vertical central section thereof. Fig. 3, is a cross section. Fig. 4, is a perspective view of one of the rotary racks detached showing one of its receptacles removed therefrom and in perspective.

In the special example illustrated, I show an upright inclosure or chamber formed by a casing having a closed floor 1, a vertical cylindrical, or other inclosing wall 2, and a top closure composed of a central diametrical cross bar 3, secured to said wall 2, and two opposite segmental vertically swingable doors or covers 4, hinged to said cross bar to close down on the top edge of the upright wall.

5, is a vertical vent pipe carried by cross bar 3, and opening through the same into the upper end of the interior of the chamber or inclosure. This vent pipe can be provided with a damper 6, having an operating handle 7, at the exterior of the inclosure, whereby the otherwise open vent pipe can be closed or the passage therethrough contracted.

I show the lower end of the inclosing wall 2, formed with several transverse ventilating holes or passages 8, which can be controlled, closed or opened, by exterior vertical slides or dampers 9. I also show a valved drain pipe or tube 10, to drain off and discharge water or moisture collecting on the floor of the inclosure. I usually provide this drain pipe with any suitable valve whereby the pipe can be opened or closed.

I show the inclosing wall 2, formed with a vertical opening whereby access can be gained to the chamber inclosed by the wall, and provided with one or more doors for closing the opening. Two horizontally swinging doors 11, are shown hinged to the wall and adapted to meet at their free edges. A suitable latch 12, can be provided for locking the doors tightly closed. In the specific example illustrated, I show a vertical stationary post 13, at its lower end suitably secured to the floor of the inclosure, and at its upper end braced and held by a collar 14, rigid with horizontal radial arms or braces 15, at their outer ends suitably secured to the inclosing vertical wall 2. On this post I arrange and center one or more rotary racks or holders. Each rack consists of a central vertical collar or hub 16, loosely embracing and turnable on the post, several radiating vertically disposed supporting partitions, arms or walls 17, rigid with and carried by said hub, a horizontal open floor secured to the lower edges of the radial arms or partitions and if so desired, composed of several spaced concentric rings 18, carried by said partitions and affixed to the lower edges thereof.

Where several superimposed racks are mounted on the post, loose collars or spacing rings 19, can be interposed between the hubs thereof to permit free and independent rotation of each rack, and the hub of the lower rack can be upheld the desired distance from the floor of the inclosure by any suitable means, such as a sleeve 20, on the lower end of the post. Each rack is adapted to removably receive and support one or more grain pans or receptacles for containing a measured, or suitable, quantity of the grain to be treated preparatory to feeding to cattle. In the specific example illustrated, I show each rack formed and adapted to carry four sector shaped pans 21, each open at the top and having a perforated or reticulated bottom or floor. If so desired, the pans can be of uniform capacity and each adapted to receive a known measured quantity of grain. Each pan or box fits between a pair of arms or walls 17, and extends inwardly to or about to the hub of the rack, and rests on the open floor of the rack. The series of racks are so arranged that the grain pans can be easily placed on and removed from all of the racks through the opening in the vertical inclosing wall when the doors thereof are open.

In carrying out the process or method of preparing the grain, the desired quantity of grain is placed in each box or pan, and the boxes are placed on the racks; the racks being rotated so that each box receiving compartment thereof can be provided with a box of grain. Water is applied to the grain in each box, usually by sprinkling the same, the operator rotating the racks to bring each box thereof to the front in succession so that the grain therein can be readily sprinkled, inspected, or stirred if desirable. After the grain in all the boxes has been sprinkled to the desired extent, or supplied with the necessary amount of moisture to start germination or to cause swelling thereof, the inclosure is usually tightly closed to render the same approximately air tight. The casing doors can be opened and the grain sprinkled and stirred, if necessary, at intervals to cause the desired germination, and sprouting of the grain. Whenever necessary or desirable in carrying out the process the necessary ventilation is afforded through the lower gate controlled air openings and the top damper controlled vent pipe. Also, when necessary, the top covers can be either or both swung open to increase the circulation of air through the inclosure. When the grain has become swollen to the desired extent, or has sprouted, to the desired extent, it can be removed for feeding the cattle.

The process can be more efficiently carried out by employing the inclosing casing whereby dust and dirt can be kept from the grain during the germinating process and whereby the process can be accurately controlled by the ventilating means provided by the inclosure.

Material advantages are attained by employing the rotary racks each adapted to carry several grain boxes as the grain can thereby be more readily handled and treated during the process, and by employing boxes with perforated or open work bottoms, the surplus moisture can drain from the boxes of an upper rack onto the grain in the boxes of a lower rack and thus percolate through the entire system or series of boxes, and collect on the floor of the inclosure from which it can be drawn off by the drain pipe. Also, if need be, air can pass through the perforated bottoms of the boxes for ventilation of the grain therein if such be necessary in any stage of the process.

I do not wish to limit the broad features of my invention to grain boxes with perforated or reticulated bottoms, nor to the employment of a top closure comprising the vertically swinging or other doors, as various means might be employed for providing a closed chamber for racks carrying grain boxes, and whereby said chamber can be suitably ventilated.

What I claim is:—

1. An apparatus for use in the process of sprouting grain for cattle feed comprising a stationary vertical post, a vertical series of horizontal normally stationary racks mounted on said post and each capable of independently rotating on the same in a horizontal plane, each rack adapted to removably receive a horizontal series of independent removable grain boxes, series of independent open-top grain boxes, each adapted to receive a germinating-charge of grain and maintain the same during the sprouting process, and a germinating-chamber-forming casing inclosing said racks and boxes and having means whereby the germinating and growing temperature and humidity can be maintained within the chamber and whereby fresh air can be drawn into the chamber below said boxes, said casing having a vertical opening in length equal to the height of said series of racks whereby access can be gained to any box on any rack for stirring or sprinkling, or for removal or insertion, and means for normally closing said opening.

2. An apparatus for use in sprouting and growing grain for cattle feed comprising a germinating-chamber-forming casing having fresh air inlets at its lower portion and provided with means for opening and closing the same, said casing having a top outlet with a controlling damper, and a top opening provided with a cover for opening or closing the same, a vertical fixed post within the casing provided with a vertical series of spaced horizontal racks centered and adapted to turn thereon, series of separate grain boxes adapted to removably rest on said racks and each adapted to receive and maintain a germinating-charge of grain during the growing process, said casing having a vertical side-opening opposite all of said racks and through which access can be had to any box on any rack and means whereby said opening can be normally maintained closed.

3. An apparatus for use in preparing sprouted grain feed, comprising a vertical series of spaced horizontally movable grain box carrying racks, series of separate removable grain boxes each adapted to receive and maintain a germinating charge of grain during the germinating and growing process, and an inclosing germinating-chamber-forming casing for said racks and boxes provided with top an bottom outlets and inlets and controlling means therefor, said casing having a vertical side opening opposite all of said racks and through which access can be had to any box on any rack and means whereby said opening can be normally maintained closed.

4. In a grain sprouting apparatus, in combination, a germinating-chamber-forming casing having ventilating means, open racks in said casing, means supporting said racks one above the other in a vertical series, series of independent open-top grain boxes having reticulated floors for the passage of water therethrough, said boxes being carried by said racks so that the water can drip from the upper boxes into the lower boxes, said casing having a top opening above the open tops of the top boxes, and movable means normally closing said opening, substantially as described.

5. In a grain sprouting apparatus, in combination, a germinating-chamber-forming casing having a normally closed moisture collecting floor provided with means for discharging moisture therefrom, said casing having ventilating means, grain box supports arranged within the casing and above said floor, and series of independent removable grain boxes carried by said supports and having reticulated bottoms for the passage of moisture therethrough from the grain within the boxes, said casing having a normally closed opening through which access can be gained to said boxes.

6. A grain sprouting apparatus comprising a germinating-chamber-forming casing having a normally closed floor, and a bottom air inlet and means for opening and closing the same, and a top air outlet, grain box supports in said casing, independent removable grain boxes carried by said supports, said casing having an opening through which access can be gained to said boxes on said supports, and means for normally closing said openings.

7. A grain sprouting apparatus comprising a vertical series of grain box supports, independent removable grain boxes carried thereby, and a germinating-chamber-forming casing inclosing said supports and the boxes thereon and formed and provided with ventilating means, said casing having an opening beside all of said supports and through which access can be gained to all of the boxes thereon, and means for normally maintaining said opening closed.

8. In a grain growing apparatus, in combination, an inclosing germinating-chamber-forming casing having a normally closed floor and series of bottom inlet openings to the exterior of the casing, means for controlling the inflow of cool air through said openings and for opening and closing the same, said casing having a top outlet provided with means for controlling the outflow of heated air therethrough and for opening and closing the same, grain box supports in said casing adapted to carry open-top grain boxes arranged between said inlets and outlet, and removable open-top grain boxes each adapted to maintain a germinating charge of grain during germinating and growing thereof.

9. In a grain growing apparatus, in combination, a plurality of independently removable open-top grain boxes each formed to receive and maintain a germinating charge of grain during germination and growing, means for supporting said boxes, and an inclosing germinating-chamber-forming casing for said boxes and supporting means, said casing provided with means whereby access can be gained to said boxes therein and having a normally closed floor and a bottom inlet from the exterior of the casing provided with means for opening and closing the same and for controlling the inflow of cool air, said casing also having a top outlet for the passage of heated air from said chamber to the exterior of the casing and means for opening and closing said outlet to control the outflow therethrough, whereby flow of cool air into the lower portion of said chamber can be started, increased or diminished to control the germinating heat within the chamber, and whereby said chamber can be closed to maintain the germinating temperature and humidity therein, substantially as described.

In testimony whereof I affix my signature, in presence of two witnesses.

ALBERT W. GRUNWALDT.

Witnesses:
BERT SARGENT,
ETTA K. SARGENT.